United States Patent
Kohno et al.

(10) Patent No.: US 6,763,062 B1
(45) Date of Patent: Jul. 13, 2004

(54) RADIO COMMUNICATION SYSTEM

(75) Inventors: Ryuji Kohno, 1202-9, Hazawa-cho, Kanagawa-ku, Yokohama-shi, Kanagawa (JP); Hiroki Mochizuki, Numazu (JP)

(73) Assignees: Toshiba Tec Kabushiki Kaisha, Tokyo (JP); Ryuji Kohno, Yokohama (JP)

( * ) Notice: Subject to any disclaimer, the term of this patent is extended or adjusted under 35 U.S.C. 154(b) by 0 days.

(21) Appl. No.: 09/576,291

(22) Filed: May 23, 2000

(30) Foreign Application Priority Data

May 24, 1999 (JP) .......................................... 11-143465

(51) Int. Cl.[7] .............................................. H04B 1/38
(52) U.S. Cl. ...................... 375/220; 375/219; 375/221
(58) Field of Search ................................. 375/219, 220, 375/221, 222, 261, 264, 285; 370/334

(56) References Cited

U.S. PATENT DOCUMENTS

| | | | | |
|---|---|---|---|---|
| 3,885,217 A | * | 5/1975 | Cintron | 375/269 |
| 5,048,058 A | * | 9/1991 | Kaleh | 375/274 |
| 5,533,048 A | * | 7/1996 | Dolan | 375/222 |
| 5,809,063 A | * | 9/1998 | Ashe et al. | 375/141 |
| 6,049,307 A | * | 4/2000 | Lim | 342/383 |
| 6,107,910 A | * | 8/2000 | Nysen | 340/10.1 |
| 6,151,367 A | * | 11/2000 | Lim | 375/326 |

FOREIGN PATENT DOCUMENTS

| | | | | |
|---|---|---|---|---|
| FR | EP 0892528 | * | 1/1999 | ......... H04L/27/227 |
| JP | 63-278434 | | 11/1988 | |
| JP | 4-29254 | | 3/1992 | |
| JP | 5-244052 | | 9/1993 | |
| JP | 9-219615 | | 8/1997 | |
| JP | 9-232848 | | 9/1997 | |
| JP | 9-307337 | | 11/1997 | |
| JP | 11-122154 | | 4/1999 | |

* cited by examiner

*Primary Examiner*—Jean B. Corrielus
*Assistant Examiner*—Qutub Ghulamali
(74) *Attorney, Agent, or Firm*—Frishauf, Holtz, Goodman & Chick, P.C.

(57) ABSTRACT

When the average received signal level falls below a given threshold level, a received level detecting/monitoring section informs a microprocessor of it. The microprocessor then collects information of the arrival direction and received power of desired radiation from each terminal station and the arrival direction and received power of undesired radiation from each source of undesired radiation and recalculates amplitude and phase weight values. The microprocessor rewrites weight values already entered into a weight value table by the recalculated weight values to thereby alter amplitude and phase weight values for antenna elements of an array antenna. Thereby, the directivity of the array antenna is subjected to optimum control according to variations in electromagnetic radiation propagation environment, allowing good radio communications at all times.

12 Claims, 15 Drawing Sheets

|  | AMPLITUDE WEIGHT VALUES | | | | AMPLITUDE WEIGHT VALUES | | | |
|---|---|---|---|---|---|---|---|---|
| TERMINAL STATION N1 | A11 | A12 | A13 | A14 | P11 | P12 | P13 | P14 |
| TERMINAL STATION N2 | A21 | A22 | A23 | A24 | P21 | P22 | P23 | P24 |
| TERMINAL STATION N3 | A31 | A32 | A33 | A34 | P31 | P32 | P33 | P34 |
| ⋮ | ⋮ | ⋮ | ⋮ | ⋮ | ⋮ | ⋮ | ⋮ | ⋮ |

RADIO COMMUNICATION SYSTEM

CROSS-REFERENCE TO RELATED APPLICATIONS

This application is based upon and claims the benefit of priority from the prior Japanese Patent Application No. 11-143465, filed May 24, 1999, the entire contents of which are incorporated herein by reference.

BACKGROUND OF THE INVENTION

The present invention relates to a radio communication system that is applied to, for example, indoor wireless LAN systems and adapted for data transmissions between a base station and a number of terminal stations.

Radio communications in indoor space are highly susceptible to fading due to multipath interference (multiple reflected waves). It is therefore effective to transmit and receive data with directivity concentrated in the direction of maximum reception. For example, Japanese Unexamined Patent Publication No. 9-232848 discloses radio communications equipment that is constructed, as shown in FIG. 19, from an array antenna 1, circulators 2, receiving modules 3 each comprising a low-noise amplifier and a down converter, analog-to-digital (A/D) converters 4, quasi-coherent detectors 5, local oscillators 6 and 7, a digital beam former (DBF) 8, a beam selector 9, a maximum ratio combiner 10, a demodulator 11, an in-phase divider 12, phase/amplitude correction units 13, a weight separation calculation circuit 14, a transmission weight calculation circuit 15, quadrature modulators 16, transmitting modules 17 each consisting of an up converter and a transmitting power amplifier, and transmitting local oscillators 18 and 19.

Signals received by the antenna elements of the array antenna 1 are amplified and converted into digital signals in the A/D converters 4. The digital signals are subjected to quasi-coherent detection in the quasi-coherent detectors 5 and then combined in the maximum ratio combiner 10 with their weight values varied so that the S/N ratio at receive time becomes maximized. At transmit time, the transmitting weight value calculation circuit 15 calculates transmitting weight values on the basis of the receiving weight values calculated by the weight separation/calculation circuit 14. After transmit signals are weighted by the transmitting weight values, a transmit main beam is formed and transmitted in the direction of maximum reception from the array antenna 1 via the quadrature modulators 16 and the transmitting modules 17.

The conventional equipment needs to calculate the direction of arriving radiation in real time (namely, in sequence) and switch the directivity in order to track the station with which the connection has been set up. As a result, calculation processing is performed mainly by hardware rather than by software. Thus, the equipment has a problem of being complex in circuit arrangement and increasing in size.

To solve this problem, Japanese Unexamined Patent Publication No. 9-219615 discloses an adaptive array transmitter-receiver, which is constructed, as shown in FIG. 20, from an antenna array 21 comprised of a number of antenna elements, weighting units 22 for weighting the amplitude and phase of each of signals which are to be transmitted from or are received by the antenna elements, a divider/combiner 23 for distributing transmit signals to the antenna elements or combining received signals from the antenna elements through the weighting units 22, an interface 25, and an external operations unit 26. The external operations unit 26 can perform calculations for adaptive control of the antenna directivity in non-real time. The weight factor switching from terminal to terminal is made on a time division basis with a time slot preallocated for each terminal.

The weighting units 22 varies each of the phase and amplitude of each of signals output from the divider/combiner 23 by a predetermined amount or multiplies each of the signals by a complex weight value. Electromagnetic waves are then emitted from the respective antenna elements 21 in a desired transmitting radiation pattern. On the other hand, received signals from the antenna elements 21 are controlled in phase and amplitude or multiplied by complex weight values in the weighting units 22 and then combined in the divider/combiner 23. In this manner, a desired receiving radiation pattern is formed.

However, in the adaptive array transmitter-receiver disclosed in Japanese Unexamined Patent Publication No. 9-219615, recalculations of the weight values are performed in the external operations unit 26 on the results of reception of reference signals transmitted from the terminal stations at relatively long intervals of time. Another way involves recalculating weight values in the external operations unit 26 on the basis of weight values used in the last time slot and using the recalculated weight values as weight values in the current time slot. In this manner, variations in the electromagnetic wave propagation environment are coped with.

The recalculations of weight values at long intervals of time cannot exactly follow variations in the propagation environment because variations in the electromagnetic wave propagation environment do not occur always at regular intervals.

In the latter method, if the time interval between each time slot is reduced, variations in the electromagnetic wave propagation environment will be coped with. However, the calculations of weight values at short time intervals will require an expensive unit adapted for fast operations. In this case, the calculations will result wastefully when the propagation environment suffers little from variations.

Thus, trying to detect variations in the electromagnetic wave propagation environment at regular intervals will result in failure to catch variations in the environment fully and in redundant, inefficient calculations of weight values.

BRIEF SUMMARY OF THE INVENTION

It is therefore an object of the present invention to provide a radio communication system which allows good communications at all times irrespective of variations in electromagnetic radiation propagation environment and allows the hardware arrangement to be made simple.

According to the present invention, there is provided a radio communication system including a base station having a receiving section which weights the amplitude and phase of each of received signals from a plurality of antenna elements by amplitude and phase weight values set in the receiving section, then combines the weighted signals into a composite signal and demodulates the resultant composite signal and a transmitting section which divides a modulated signal into a plurality of transmit signals, then weights the amplitude and phase of each of the transmit signals by amplitude and phase weight values set in the transmitting section and radiates each of the weighted transmit signals from a corresponding respective one of the antenna elements, and a number of terminal stations each of which is adapted to perform radio communications with the base station, the base station including: receiving condition detecting means for detecting a variation in the receiving condition of the receiving section; and weight value rewrite means for, when a variation in the receiving condition of the receiving section is detected by the receiving condition detecting means, recalculating amplitude and phase weight values to be used in the receiving and transmitting sections and rewriting the amplitude and phase weight values already set in the receiving and transmitting sections by the recalculated weight values.

In an aspect of the present invention, the receiving condition detecting means includes received signal level detecting means for detecting a lowering of the received signal level in the receiving section, and the weight value rewrite means recalculates and rewrites the weight values in the receiving and transmitting sections when a lowering of the received signal level is detected by the received signal level detecting means.

In another aspect of the present invention, radio communications are performed between the base station and each of the terminals station by a frequency hopping spectrum spreading technique, the receiving condition detecting means includes error rate detecting means for detecting an increase in error rate of a demodulated signal by the receiving section, and the weight value rewrite means recalculates and rewrites the weight values in the receiving and transmitting sections when an increase in error rate is detected by the error rate detecting means.

In still another aspect of the present invention, radio communications are performed between the base station and each of the terminals station by a direct spread spectrum spreading technique, the receiving condition detecting means includes communication disabled state detecting means for detecting a communications disabled state of the base station, and the weight value rewrite means recalculates and rewrites the weight values in the receiving and transmitting sections when a communications disabled state of the base station is detected by the communications disabled state detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiment given below, serve to explain the principles of the invention.

DETAILED DESCRIPTION OF THE INVENTION

The preferred embodiments of the present invention will be described hereinafter with reference to the accompanying drawings.

FIRST EMBODIMENT

Figure 1:
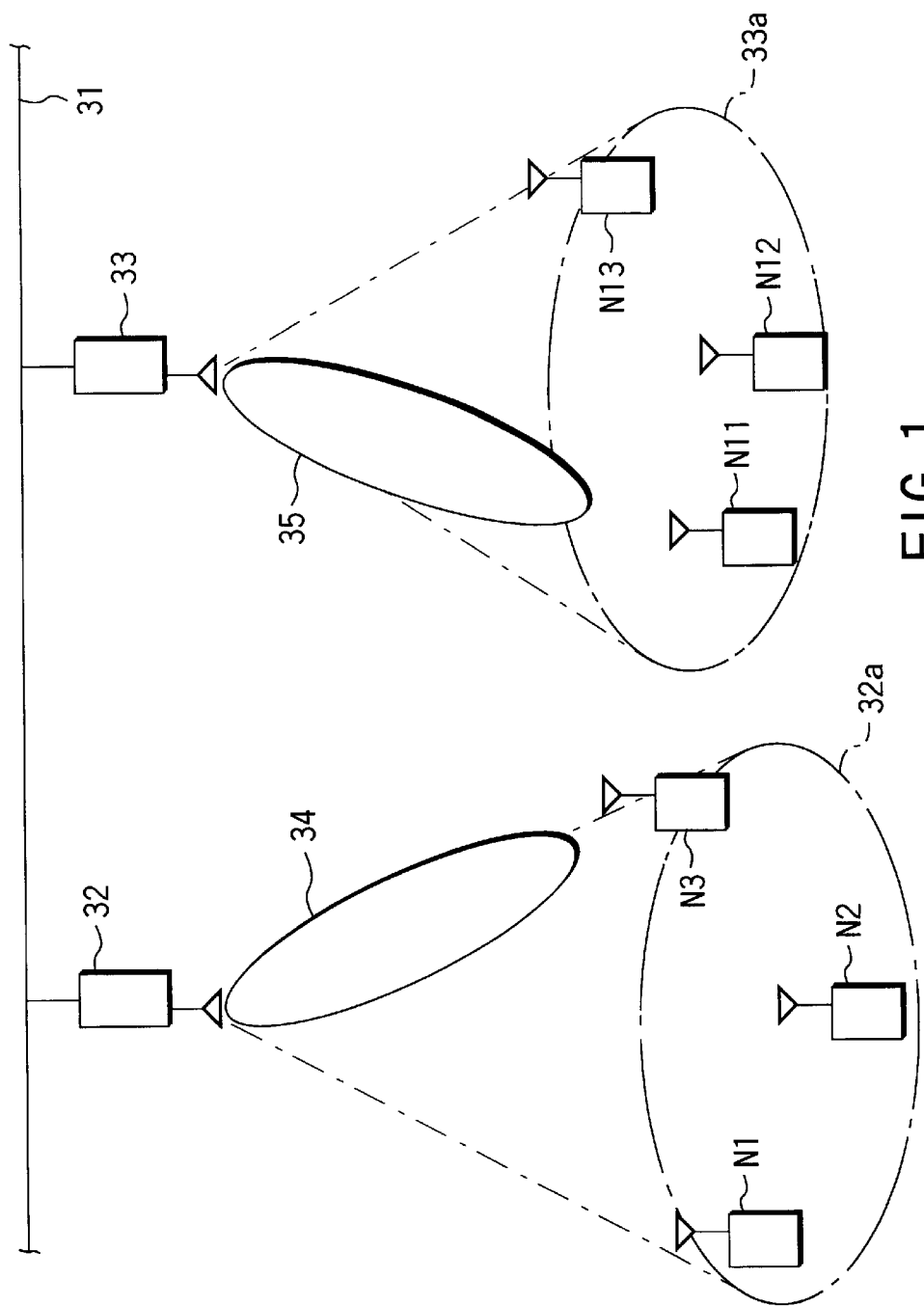
FIG. 1 is a schematic illustration of an indoor radio communication system to which the present invention is applied.

FIG. 1 is a schematic illustration of an indoor radio communication system to which the present invention is applied. In this system, as an example, base stations 32 and 33 are linked to a local area network (LAN) 31. Terminal stations N1, N2 and N3 are installed within the service area 32a of the base station 32. Terminal stations N11, N12 and N13 are installed within the service area 33a of the base station 33.

In order not to suffer multipath fading or shadowing, each of the base stations 32 and 33 uses a directional beam 34 or 35 for communication with an individual one of its associated terminal stations N1 to N3 or N11 to N13. The terminal stations N1 to N3 and N11 to N13 are not used while being moved, but once they are installed, they are not moved for a relatively long period of time. Thus, the directional beams 34 and 35 each differ in optimum direction and beam pattern for each of their associated terminal stations installed in different places.

Unlike the base stations, each of the terminal stations N1 to N3 or N11 to N13 is allowed to use either of directional and nondirectional beams for communications with a corresponding one of the base stations 32 and 33. For example, when a communications request occurs in the terminal station N1, it sends a communication request signal to the corresponding base station 32 upon receipt of a base station identification signal therefrom.

Figure 2:
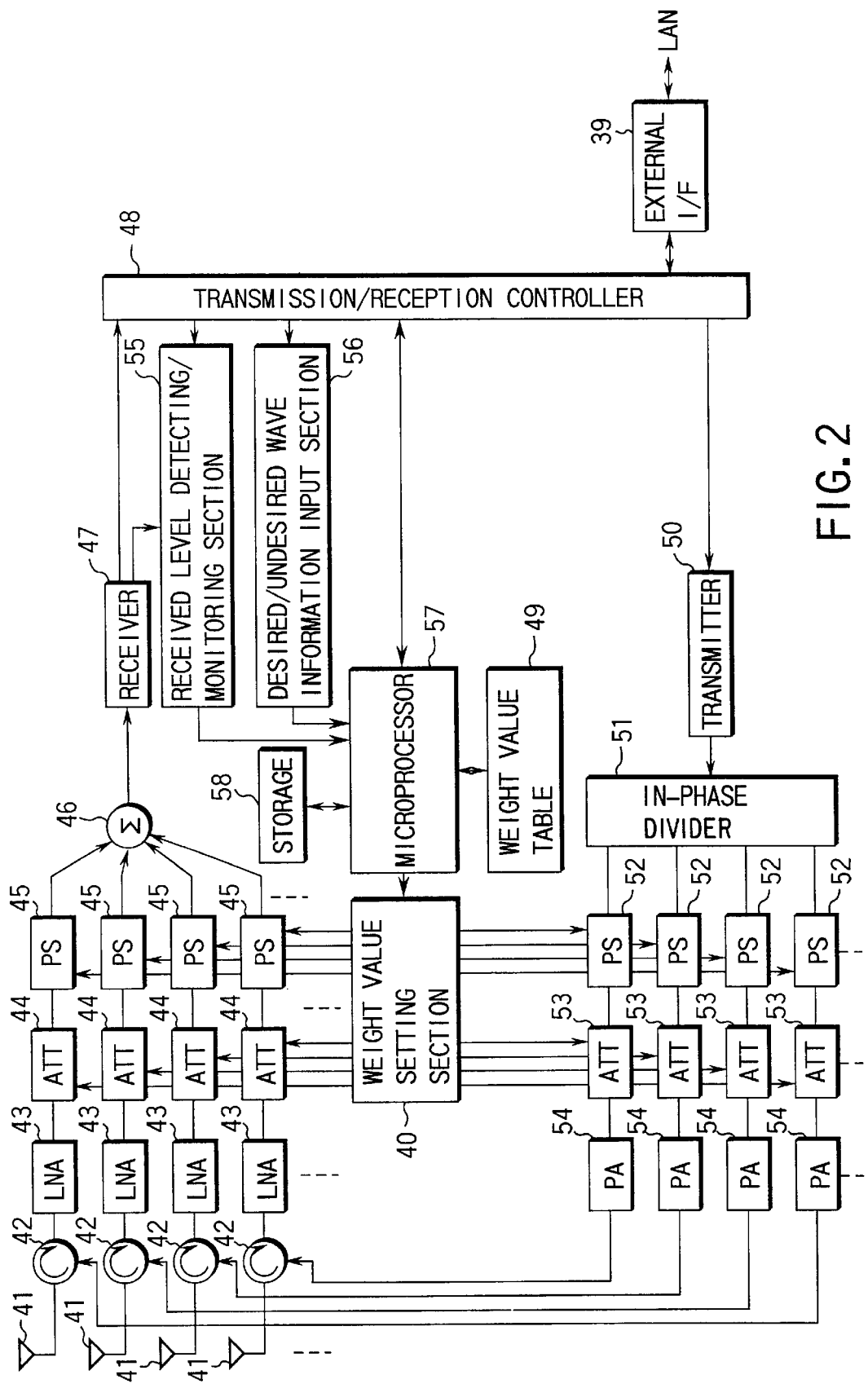
FIG. 2 is a block diagram of a base station according to a first embodiment of the present invention.

Referring now to FIG. 2, there is illustrated in block diagram form the arrangement of the base stations. The base station is provided with an array antenna consisting of a plurality of antenna elements 41 adapted for both transmission and reception, circulators 42 each corresponding to one of the antenna elements, low-noise amplifiers (LNA) 43 each for amplifying a received signal from a corresponding one of the circulators, attenuators (ATT) 44 each for controlling the amplitude of an amplified signal from a corresponding one of the low-noise amplifiers, and phase shifters (PS) 45 each for controlling the phase of an output signal of a corresponding one of the attenuators.

The received signals from the phase shifters 45 are combined in a liner combiner 46 and then applied to a receiver 47. This receiver 47 performs receiving operations, such as demodulation, etc., and outputs recovered data, which is in turn applied to a transmission/reception controller 48. The controller then sends the recovered data to the host equipment over an external interface (I/F) 39 and the LAN 31.

The antenna elements 41, the circulators 42, the low-noise amplifiers 43, the attenuators 44, the phase shifters 45, the linear combiner 46 and the receiver 47 constitute a receiving section. Each of the attenuators 44 independently controls the amplitude of the corresponding received signal and each of the phase shifters 45 independently controls the phase of the corresponding received signal. The amounts by which the amplitude and phase are varied are set by amplitude and phase weight values entered into a weight value storage table 49. A microprocessor 47 reads the weight values from the weight value storage table 49 and delivers them to a weight value setting section 40, which outputs the weight values to the attenuators 44 and the phase shifters 45 to keep their output values. Thus, appropriately weighting the received signals from the antenna elements 41 by the weight values read from the weight value storage table 49 allows the array antenna to form desired receiving directivity as an adaptive array antenna.

The base station includes a transmitter 50 that modulates transmit data from the transmission/reception controller 48 to produce a transmit signal, an in-phase divider 51 that divides the transmit signal from the transmitter 50 into in-phase signals corresponding in number to the antenna elements, phase shifters (PS) 52 each of which shifts the phase of a corresponding one of the in-phase signals from the divider, attenuators (ATT) 53 each of which controls the amplitude of a corresponding one of the phase shifted signals from the phase shifters, power amplifiers (PA) 54 each subject the output signals of the respective attenuators to power amplification, and circulators 42 that delivers the power-amplified signals to the antenna elements 41.

The transmitter 50, the in-phase divider 51, the phase shifters 52, the attenuators 53, the power amplifiers 54, the circulators 42 and the antenna elements 41 form a transmitting section. The attenuators 53 and the phase shifters 52 independently control the amplitude and phase of the in-phase transmit signals. The amounts by which these signals are controlled are set, as stated previously, on the basis of amplitude and phase weight values stored in the weight value storage table 49. Thus, desired transmitting directivity is formed by the adaptive array antenna by appropriately weighting the in-phase transmit signals by the amplitude and phase weight values read from the weight value storage table 49.

The transmission/reception controller 48 controls a received level detecting/monitoring section 55 and a desired/undesired wave information input section 56. The received level detecting/monitoring section 55 monitors the level of received signal from the receiver 47 and, when the received signal level falls below a predetermined threshold level, detects it and presents the result of the detection to the microprocessor 57. The desired/undesired wave information input section 56 stores the direction of arrival of and the received power of a desired wave from each terminal station, the direction of arrival of and the received power of an undesired wave from an undesired wave source, and the thermal noise of each element in the transmitting and receiving sections. The information thus obtained is used when the microprocessor 57 carries out an adaptive processing algorithm.

The microprocessor 57 controls the transmission/reception controller 48 and controls the weight value table 49 and the storage section 58 on the basis of information from the received level detecting/monitoring section 55 and the desired/undesired wave input section 56. That is, the microprocessor 57 calculates weight values to be set in the transmitting and receiving sections for each terminal station and writes them into the weight value table 49. In communicating with a terminal station by radio, the microprocessor reads the weight values that correspond to that terminal station and are to be set in the transmitting and receiving sections from the weight value table 49, thereby controlling the directivity of the transmitting and receiving sections. In the storage section 58 are stored an adaptive processing algorithm for the receiving section and an optimum directivity synthesis algorithm for the transmitting section.

Figure 3:
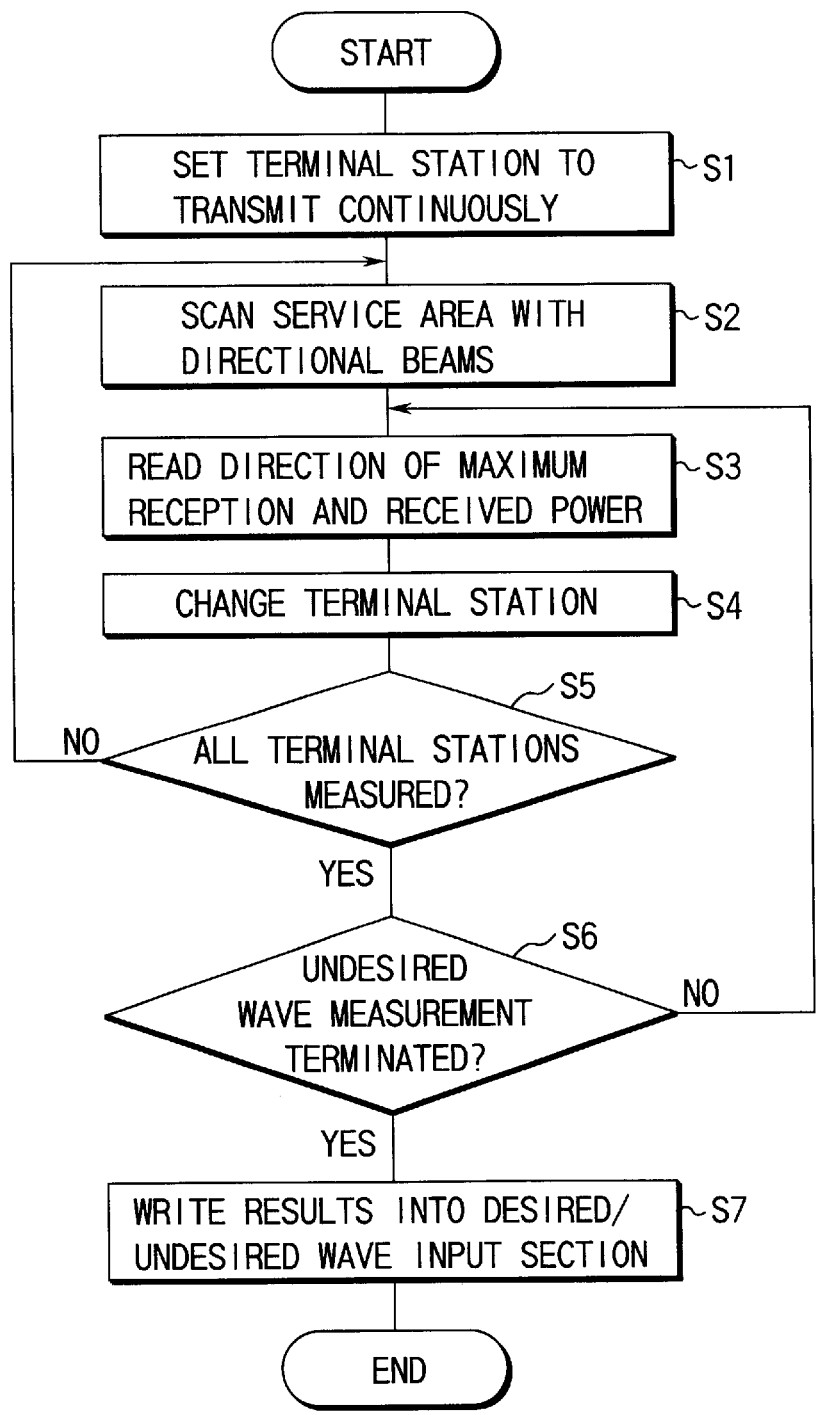
FIG. 3 is a flowchart for measurement of arrival directions and received levels of desired and undesired waves by the microprocessor.

In the desired/undesired wave information input section 56 are stored the arrival direction and received power of a desired wave from each terminal station and the arrival direction and received power of an undesired wave from each undesired wave source. FIG. 3 is a flowchart for processing by which the base station scans its associated service area, collects information concerning the arrival direction and received power of each of desired and undesired waves, and writes the information into the desired/undesired wave information input section 56. As stated previously, once the terminal stations N1 to N3 and N11 to N13 have been installed, they will not be moved over a relatively long period of time. It becomes therefore possible for the base station to know beforehand the location of each individual terminal station and the location of each source of undesired radiation, that is, the arrival direction of desired radiation from each terminal station and the arrival direction of undesired radiation. Also, it becomes possible to know beforehand the received levels of desired and undesired waves and thermal noise that occurs in each antenna element through actual measurements and calculations.

The procedure shown in FIG. 3 is carried out by the microprocessor 57, for example, at the time when a base station and its associated terminal stations are installed. First, in step S1, a terminal station is placed in the continuously transmitting state for the purpose of determining the direction of propagation of radiation therefrom. In step S2, by changing the phase and amplitude weight values for the antenna elements 41 of the array antenna in sequence, the base station searches for radiation from that terminal station. Note here that the receiving directivity of the array antenna can be steered to all directions by changing the weight values for the attenuators 44 and the phase shifters 45 in succession.

In step S3, the direction of maximum reception of a signal from the terminal station and its received power are measured. At the termination of the measurement, switching is made from that terminal station to another in step S4 and the procedure is then repeated beginning with step S2.

After the termination of measurements on all the terminal stations, measurements are now performed on undesired radiation. In this case, all the terminal station are stopped from making transmission, and the arrival direction and received power of each Arrival are measured. At the termination of undesired radiation measurements, the results are written into the desired/undesired wave information input section 56 in step S7. Such information acquisition can be performed by using the MUSIC algorithm based on eigenvalue expansion of correlated values of received signals.

Using the information stored in the desired/undesired wave information input section 56, the microprocessor 57 can determine the optimum weight values to be set in the receiving and transmitting sections for each terminal station through calculations based on the adaptive processing theory for adaptive array antennas and the directivity synthesis theory for array antennas. The arrangement of the antenna elements 41 and the used frequency of the array antenna are known.

Figures 4, 5:
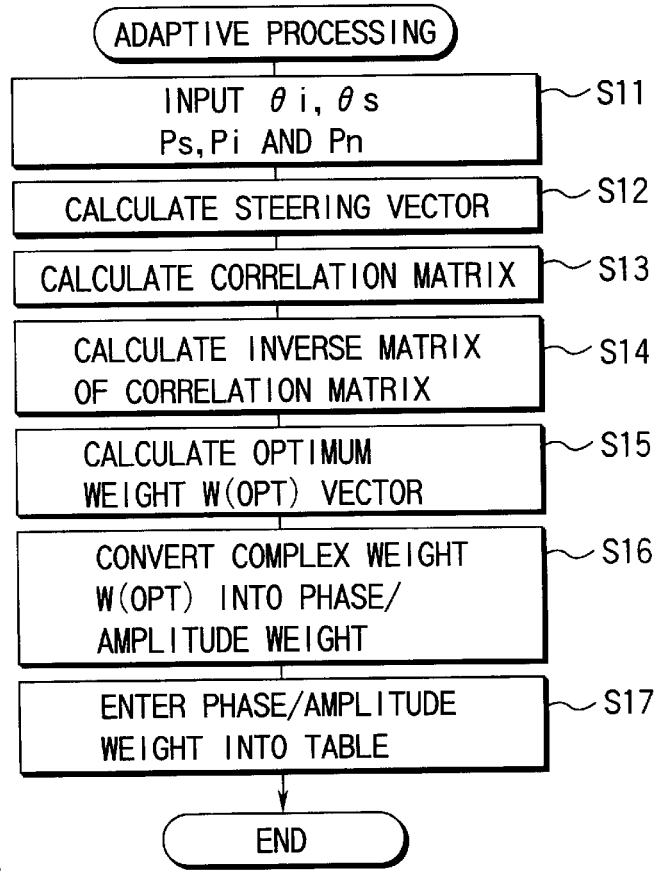
FIG. 4 shows settings of weight values in the weight value table in FIG. 2.
FIG. 5 is a flowchart for adaptive processing for determination of weight values for the receiving section in the first embodiment.

FIG. 4 shows examples of settings of weight values for the terminal stations N1, N2, N3, . . . in the weight value table 49. In this table, the amplitude and phase weight values for the respective antenna elements 41 are stored for each terminal station. For example, for the terminal station N1, the receiving amplitude weight factors for the respective antenna elements are A11, A12, A13, A14, . . . and the receiving phase weight values are P11, P12, P13, P14, . . . The transmitting amplitude and phase weight values for each terminal station are also stored in the same manner.

With this system, when no terminal station with which communications are to be performed is specified, the microprocessor 57 in the base station 32 reads weight values for scanning its associated service area from the weight value table 49 and controls the directivity for each of transmission and reception. Thereby, the service area 32a associated with the base station 32 is scanned with directional beams. Upon receipt of an identification signal and a communications request signal from a terminal station, the base station 32 commences communications with that terminal station. At this point, the optimum weight values for the terminal station are read from the table 49 and then set in the transmitting and receiving sections, allowing communications under the optimum radiation pattern for transmission and reception.

The weight values to be stored in the table 49 are calculated by the microprocessor 57 on basis of the adaptive processing algorithm stored in the storage section 58. The adaptive processing algorithms include MSN (maximum signal to noise ration) algorithms, CMA (constant modulus algorithm) algorithms, etc. Calculations based on the MSN algorithms require information concerning the arrival direction and received power of desired radiation from each terminal station, the arrival direction and received power of undesired radiation, the noise power of each of the transmitting antenna elements.

These pieces of information are previously acquired and stored in the desired/undesired wave information input section 56 as shown in FIG. 3. Based on the information, the microprocessor 57 calculates amplitude and phase weight values for each terminal station and for each antenna element in accordance with the adaptive processing algorithm to be described later and writes them into the weight value table 49. The weight values thus calculated for a terminal station are read from the table to control the attenuators 44 and the phase shifters 45. As a result, the array antenna has a strong directivity characteristic in the direction of a desired wave from that terminal station and makes a null response in the direction of undesired radiation, i.e., has no sensitivity in the direction of undesired radiation. Thus, the adaptive array antenna is allowed to adapt to electromagnetic radiation propagation environments.

However, the weight values thus stored in the weight value table 49 gradually become unsuited owing to variations in the electromagnetic radiation propagation environment as described later. The received level detecting/monitoring section 55 detects variations in the electromagnetic wave propagation environment as variations in the received signal level. When variations in the received signal level are detected, the microprocessor 57 performs the information acquisition shown in FIG. 3 again, recalculates the weight values, and rewrites the contents of the weight value table 49. The weight values for the transmitting section are likewise rewritten. For the formation of the optimum radiation pattern for transmission, use is made of a directivity synthesis theory to be described later.

FIG. 5 shows an example of an algorithm for determining optimum weight values for reception on the basis of the array antenna adaptive processing theory, which is referred to as the MSN algorithm. This MSN algorithm is fit to optimize the receiving directivity when the directions and received power of desired and undesired waves are known.

This adaptive processing is performed by the microprocessor 57. First, in step S11, the microprocessor receives the direction at which undesired radiation arrives ($\theta$i), the direction at which desired radiation arrives ($\theta$s), the input power of the desired radiation (Ps), the input power of the undesired radiation (Pi), and the amount of thermal noise power of the antenna elements for the receiving section (Pn) from the desired/undesired wave information input section 56 and then produces an input signal vector X(t) in accordance with the following equation $$X(t)=S(t)+I(t)+N(t) \tag{1}$$

where S(t) represents desired radiation vector, I(t) represents undesired radiation vector, and N(t) represents noise power vector.

Next, in step S12, a steering vector $\bar{s}$ is determined by $$\bar{s} = \left[ \exp\left(j\frac{2\pi}{\lambda} \cdot dl \cdot \sin\theta_s\right), \ldots , \exp\left(j\frac{2\pi}{\lambda} \cdot dk \cdot \sin\theta_s\right) \right] T \tag{2}$$

where d is the spacing of the antenna elements and $\lambda$ is the wavelength of a carrier wave.

In step S13, a correlation matrix Rxx is determined by $$Rxx=E[X(t)X^H(t)] \tag{3}$$

where E[·] represents the expected value (ensemble average, i.e., time average).

In step S14, the inverse matrix $Rxx^{-1}$ of the correlation matrix Rxx is determined.

In step S15, an optimum weight value:W(OPT) vector is determined by $$W_{opt} = R_{xx}^{-1} \cdot \bar{s} = \begin{bmatrix} W_{opt1} \\ \vdots \\ W_{optk} \end{bmatrix} = \begin{bmatrix} WR_{opt1} + jWI_{opt1} \\ \vdots \\ WR_{optk} + jWI_{optk} \end{bmatrix} \quad (4)$$

That is, the optimum weighting vector W(OPT) is determined by the product of the inverse matrix $Rxx^{-1}$ of the correlation matrix and the steering vector $\bar{s}$.

In step S16, each complex weight W(OPT) is converted into a phase/amplitude weight as follows:

$$\begin{cases} A_{optk} = (|WR_{optk}|^2 + |WI_{optk}|^2)^{\frac{1}{2}} \\ (i) \text{ When } WR_{optk} < 0 \text{ and } WI_{optk} > 0 \\ \quad \phi_{optk} = \tan^{-1}\left(\frac{WI_{optk}}{WR_{optk}}\right) + \pi \\ (ii) \text{ When } WR_{optk} < 0 \text{ and } WI_{optk} < 0 \\ \quad \phi_{optk} = \tan^{-1}\left(\frac{WI_{optk}}{WR_{optk}}\right) - \pi \\ (iii) \text{ In a case other than } (i) \text{ and } (ii) \\ \quad \phi_{optk} = \tan^{-1}\left(\frac{WI_{optk}}{WR_{optk}}\right) \end{cases} \quad (5)$$

Finally, in step S7, the phase and amplitude weight values are entered into the weight value table 29.

The algorithms for determining optimum weight values for reception include the method of a minimum mean squared of error (MMSE), the constant modulus algorithm (CMA), and so on. Information that is to be known in advance varies with the algorithms used.

Figure 6:
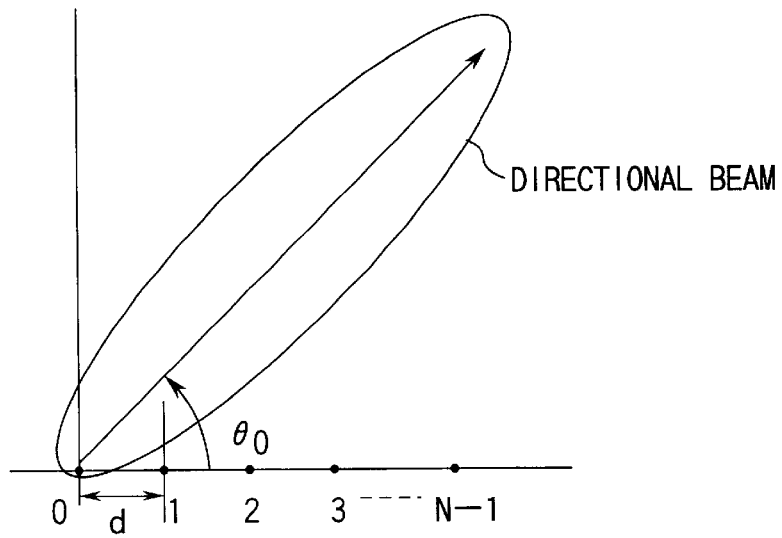
FIG. 6 is a diagram for use in explanation of the method of forming a transmit beam that points in the direction of $\theta_0$ by adjusting the weight values for the transmitting section of the base station in the first embodiment.

FIG. 6 shows an example of directivity synthesized by the transmitting section. There are some directivity synthesis theories for array antennas. The basic equation representing the synthesized directivity of linear array antennas is given by $$E(\theta) = \sum_{n=0}^{N-1} An \exp\{jnkd(\cos\theta - \cos\theta_0)\} \quad (6)$$

$$k = 2\pi/\lambda$$

where $E(\theta)$ represents the amplitude in the direction of $\theta$ and An represents the amplitude weight value for the n-th element.

This equation is used in orienting the radiation pattern in the direction of $\theta_0$, i.e., in the desired direction.

FIG. 6 shows an example of a radiation pattern synthesized to point in the direction of $\theta_0$, by an array antenna having N antenna elements arranged at regular intervals of d. This figure shows the most straightforward example when a transmit beam is radiated in the direction of $\theta_0$ by adjusting the weight values in the transmitting section of the base station. In the figure, black dots 0 to $N^{-1}$ denote the antenna elements of the array antenna. In order to obtain the radiation pattern in the desired direction of $\theta_0$, the excitation phase of the n-th element is simply set to $n \cdot k \cdot d \cdot \cos\theta_0$. As a result, in-phase electromagnetic waves are radiated pointing in the desired direction of $\theta_0$ from the antenna elements 21. The value for An can be determined mathematically. Antennas in which side lobes are reduced using this method include Dolph-Chebyshev array antennas, Talor distribution array antennas, etc.

Thus, desired directivity can be obtained by adjusting amplitude and phase weight values in the transmitting section as well. There are other methods of transmitting directivity formation.

Figure 7:
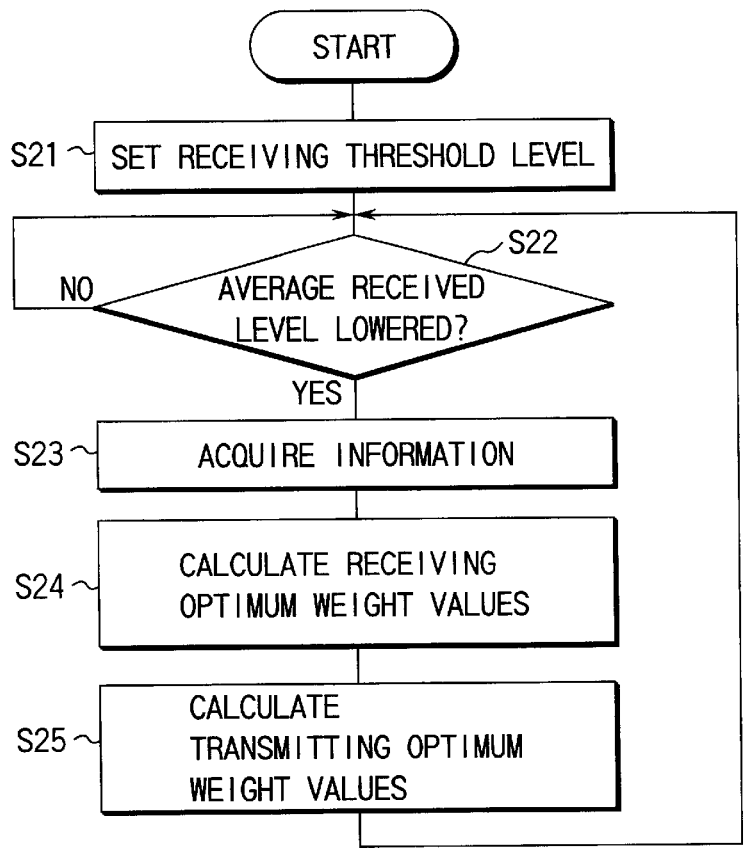
FIG. 7 is a flowchart for recalculation processing of weight values in the first embodiment.

FIG. 7 is a flowchart for processing by which the microprocessor 57 recalculates weight values and rewrites the weight value table 49 when the electromagnetic wave propagation environment varies relatively slowly with time in the service area 32a or 33a of the base station 32 or 33. Such variations in the electromagnetic wave propagation environment may occur when objects are moved or the number of people changes in the service area.

The weight value table 49 is stored with weight values for each of the receiving and transmitting sections calculated by the microprocessor 57 for each terminal. For communications with a terminal station, the transmitting and receiving weight values corresponding to that terminal station are read from the weight value table 49 and then set in the weight value setting section 40, thereby controlling the directivity of the array antenna for transmission and reception. At the time of communications, the procedure shown in FIG. 7 is carried out.

First, in step S21, a receiving threshold level is set in the received level detecting/monitoring section 55 via the transmission/reception controller 48. The threshold level is a value determined by experiment, for example. In step S22, the received level detecting/monitoring section 55 makes a decision of whether the average received signal level has fallen below the receiving threshold level. When the average received level has fallen, the microprocessor 57 receives from the received signal level detecting/monitoring section 55 notification to that effect. In step S23, the microprocessor 57 performs information acquisition as shown in FIG. 3 to obtain information necessary for adaptive processing algorithm.

The microprocessor 57 calculates, in step S24, the optimum weight values for the receiving section in accordance with the adaptive processing algorithm shown in FIG. 5 and then calculates, in step S15, the optimum weight values for the transmitting section through the transmitting directivity synthesis described with reference to FIG. 6. The weight values in the table 49 are rewritten by weight values recalculated to accommodate variations in the electromagnetic wave propagation environment, thereby altering weight values for the receiving and transmitting sections. Thereby, communications between the base station and the terminal stations are performed under the directivity controlled based on the updated weight values. The microprocessor 57 then returns to step S22 to start the detection of a variation in received signal level again. In this manner, the base station is allowed at all times to make good radio communications with each terminal station under the directivity most suitable for the current electromagnetic wave propagation environment.

Thus, in this embodiment, since the weight values to be set in the receiving and transmitting sections are calculated to accommodate variations in the electromagnetic wave propagation environment, fast responsibility, such as in conventional real-time processing, is not required. Therefore, most of the processing can be implemented by software, allowing the base station to be made very simple in hardware arrangement.

SECOND EMBODIMENT

Figure 8:
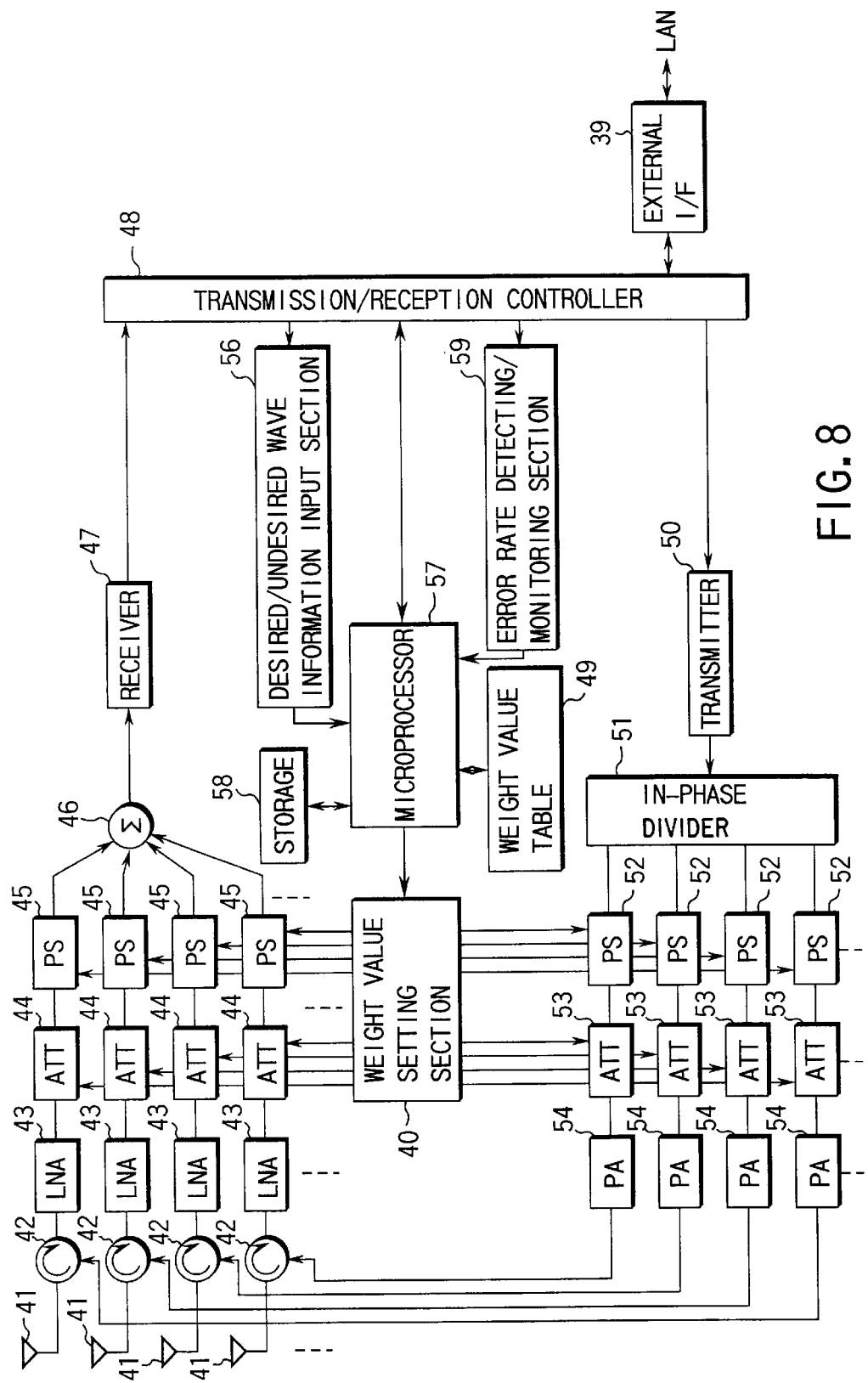
FIG. 8 is a block diagram of a base station according to a second embodiment of the present invention.

FIG. 8 is a block diagram of a base station according to a second embodiment of the present invention. In this figure, like reference numerals are used to denote corresponding components to those in the first embodiment and descriptions thereof are omitted. This embodiment will be described in terms of an application of the present invention to radio communications between the base station and each terminal station by a frequency hopping spectrum spreading system. In the frequency hopping spectrum spreading system, the carrier frequency is changed periodically. The frequency hopping band is in the range of, say, 2471 to 2497 MHz and, for example, 24 channels are allocated within this band. In this type of radio communication, the sequence in which the channels (carrier frequencies) are changed are predetermined between a base station and its associated terminal stations. Thus, each terminal upon receipt of a channel switching signal from the base station can decide which channel to use next.

In place of the received level detecting/monitoring section in the first embodiment, the second embodiment is provided, as shown in FIG. 8, with an error rate detecting/monitoring section 59 that detects variations in error rate due to hopping frequency hits.

Figure 9:
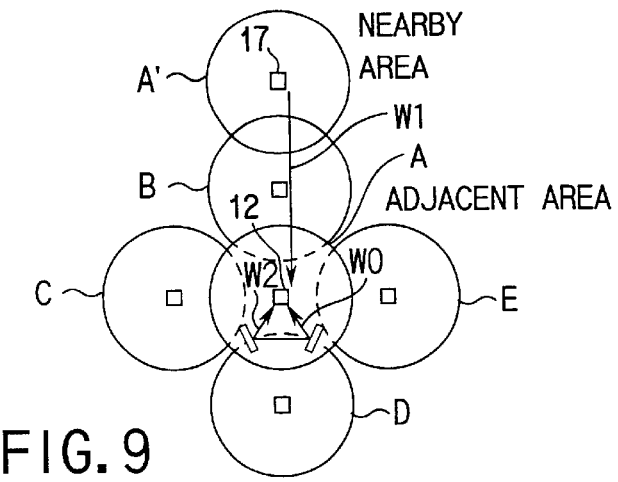
FIG. 9 is a diagram for use in explanation of a situation where the error rate increases in the second embodiment.

The use of the frequency hopping system involves a problem that an increase in the frequency hit rate with a nearby area results in an increase in the error rate. For example, as shown in FIG. 9, a base station 12 in area A hops carrier frequencies in a hopping sequence that differs from that of each of base stations in adjoining areas B, C, D, and E. In the adjoining areas, therefore, communications are not performed on the same carrier frequency. That is, setting is performed such that no frequency hit occurs.

However, there is the possibility that the base station 17 in a nearby area A', not an adjoining area, may hop the carrier frequencies in the same hopping sequence as the base station 12 in area A.

In such a case, in the event that variations in the electromagnetic radiation propagation environment result from, for example, people increasing or decreasing in number in associated areas, an interference W1 from the other station may arrive at the area A, which results in an increase in frequency hit rate and consequently in an increase in error rate. The errors include errors associated with cyclic redundancy check codes and errors associated with the number of packets to be transferred.

When the electromagnetic wave propagation environment varies with time owing to the movement of objects installed indoors, low speed frequency hopping in which the hopping rate is lower than the data rate causes an increase in error rate under the influence of multipath interferences within the same area. For example, as shown in FIG. 9, an electromagnetic wave radiated from terminal station 13 arrives at the base station 12 not only as a direct wave W0 but as a multi-path W2 from an object 18. In such case, the error rate may increase.

To solve such a problem, the error rate detecting/ monitoring section 59 detects an increase in error rate and the microprocessor 57 then recalculates the weight values on the basis of information from the desire/undesired wave information input section 56 and rewrites the weight values for the receiving and transmitting sections stored in the weight value table 49.

Figure 10:
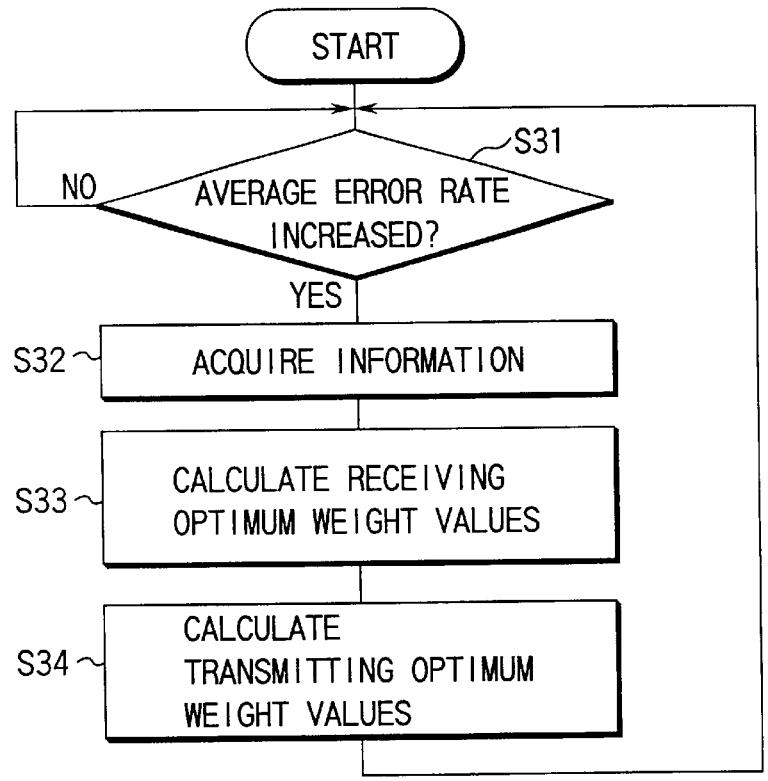
FIG. 10 is a flowchart for recalculation processing of weight values in the second embodiment.

FIG. 10 is a flowchart for recalculation of weight values in the second embodiment. In this embodiment as well, the weight value table 49 has been prestored with weight values for the receiving and transmitting sections calculated for each terminal station. For communications with a terminal station using frequency hopping, the receiving and transmitting weight values corresponding to that terminal station are read from the table 49 to control the directivity of the array antenna. And, at the time of communications, the procedure shown in FIG. 10 is carried out.

As indicated by step S31 in FIG. 10, the error rate detecting/monitoring section 59 always makes a decision of whether or not the error rate has increased. When an increase in error rate is detected, the microprocessor 57 receives notification to that effect. In step S32, the microprocessor 57 then performs information acquisition as shown in FIG. 3. That is, the microprocessor 57 measures and/or calculates the arrival direction and receive power of a desired wave from each terminal station, the arrival direction and received power of each undesired wave, and thermal noise power of each antenna element and then stores the resultant information in the desired/undesired wave information input section 56.

Next, in step S33, the microprocessor 57 calculates the receiving optimum weight values in accordance with the adaptive processing algorithm shown in FIG. 5. Next, in step S34, the microprocessor 57 calculates the transmitting optimum weight values in accordance with the transmitting directivity synthesis described with reference to FIG. 6. Thus, when the error rate has increased owing to variations in the electromagnetic wave propagation environment, the weight values are recalculated to rewrite the weight values for the receiving and transmitting sections stored in the weight value table 49 for each terminal station. After that, the amplitude and phase weight values for the receiving and transmitting sections are controlled in accordance with the updated weight values. The procedure then returns to step S31. In this manner, the base station is allowed at all times to perform good frequency-hopping-based radio communications with each terminal station under the directivity most suitable for the current electromagnetic wave propagation environment.

Thus, in this embodiment, when the error rate has increased with increasing hopping frequency hit rate, the weight values are recalculated to rewrite the weight value table 49. Therefore, there is no need to perform both the adaptive processing for the receiving section and the optimum directivity synthesis processing for the transmitting section in real time and hence the fast responsibility is not required. In addition, most of the processing can be implemented by software, allowing the base station to be made very simple in hardware arrangement.

THIRD EMBODIMENT

Figure 11:
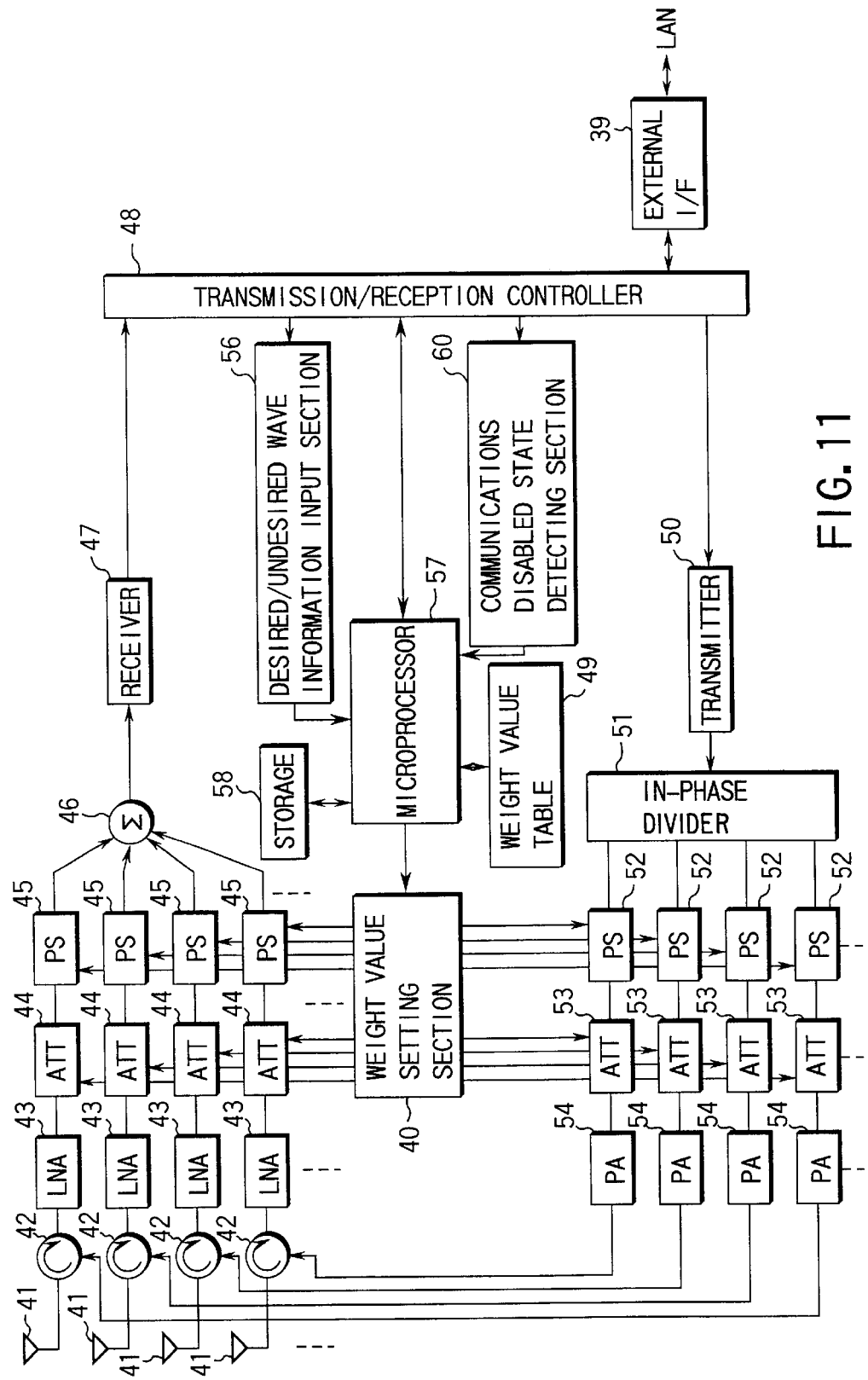
FIG. 11 is a block diagram of a base station according to a third embodiment of the present invention.

FIG. 11 is a block diagram of a base station according to a third embodiment of the present invention. In this figure, like reference numerals are used to denote corresponding components to those in the first embodiment and descriptions thereof are omitted. This embodiment will be described in terms of an application of the present invention to radio communications between the base station and each terminal station by a direct spread spectrum spreading technique. This direct spread spectrum spreading technique directly spreads signals in the same code for each area.

As shown in FIG. 11, instead of the received signal level detecting/monitoring section in the first embodiment, the base station is provided with a communications disabled state detecting/monitoring section 60 that detects its communication disabled state from the receiving condition of the receiving section.

Figure 12:
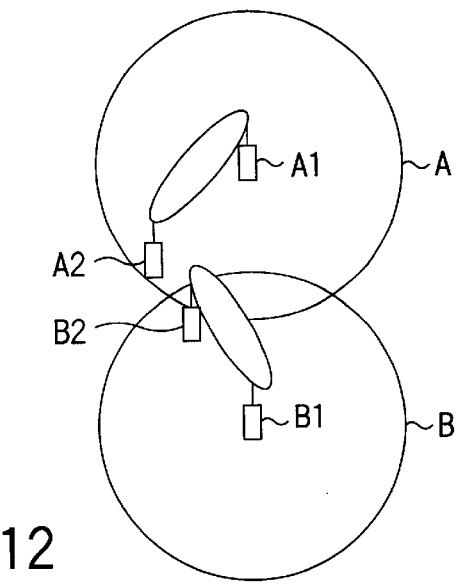
FIG. 12 is a diagram for use in explanation of a situation where a communications disabled state occurs in the third embodiment.

With radio communications based on the direct spread spectrum spreading technique, there arises a temporary communications disabled state resulting from the near-far problem. That is, communications between a base station and a terminal station may become disabled through the influence of another terminal station that is located near by and produces a high output. For example, as shown in FIG. 12, if, when communications are performed between base station A1 and terminal station A2 in area A and between base station B1 and terminal station B2 in area B, the terminal stations A2 and B2 are close to each other, there arises the near-far problem that the terminal A2 is disabled temporarily from receiving from the base station A1 while the terminal station B2 is transmitting to the base station B1.

Usually, each terminal is placed so that the near-far problem will not arise. However, when variations in electromagnetic radiation propagation environment occur in associated areas, a pseudo terminal-to-terminal proximity condition may occur, resulting in temporary inability in communications.

Stated conversely, the occurrence of the near-far problem that causes temporary inability in communications indicates the occurrence of a variation in the electromagnetic radiation propagation environment, which implies the possibility that the precalculated weight values have become unsuited for the propagation environment.

When the communications disabled state detecting/monitoring section 60 has detected the temporary communications disabled state, the microprocessor 57 recalculates weight values on the basis of information received, at that time, from the desired/undesired wave information input section 56 and rewrites the weight values for the receiving and transmitting sections stored in the weight value table 49 by the new weight values.

Figure 13:
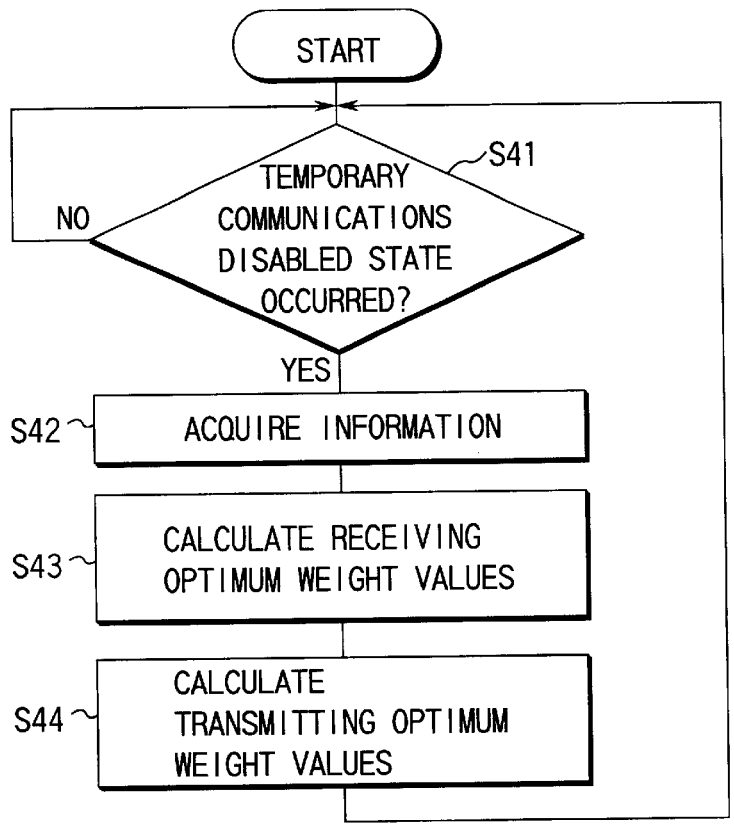
FIG. 13 is a flowchart for recalculation processing of weight values in the third embodiment.

That is, as indicated in step S41 in FIG. 13, the communications disabled state detecting/monitoring section 60 monitors the communications conditions at all times. The monitoring section makes a decision of, for example, whether data are received in a given format and, when not received, considers a communications disabled state to have occurred. At the occurrence of a communications disabled state, the microprocessor 57 receives notification to that effect from the monitoring section 60. In step S42, the microprocessor acquires information of arrival directions and received power of desired and undesired radiation in the manner described with reference to FIG. 3.

The microprocessor, in step S43, calculates the optimum weight values for the receiving section in accordance with the adaptive processing algorithm shown in FIG. 5 and then, in step S44, calculates the optimum weight values for the transmitting section in accordance with the transmitting directivity synthesis theory described in conjunction with FIG. 6. Thus, if a temporary communications disabled state occurs during radio communications based on the direct spread spectrum spreading technique, the microprocessor recalculates weight values and then rewrites the weight value table 49. The procedure then returns to step S41.

In this embodiment as well, the weight value table 49 has been prestored with weight values for the receiving and transmitting sections calculated for each terminal station. For communications with a terminal station, the receiving and transmitting weight values corresponding to that terminal station are read from the table 49 and then set in the weight value setting section 40, thereby controlling the directivity of the array antenna. After that, the base station performs radio communications with the terminal station by the direct spread spectrum spreading technique.

In the event of a temporary communications disabled state due to the near-far problem during communications, the microprocessor 57 calculates weight values anew and rewrites the weight values stored in the weight value table 49 by the new weight values, thereby updating the weight values for the receiving and transmitting sections. Thus, the optimum directivity can be maintained even in the event of a temporary communications disabled state due to variations in the electromagnetic radiation propagation environment, i.e., the near-far problem, allowing good radio communications as in the previously described embodiments.

Moreover, in this embodiment, calculations of the weight values for the receiving and transmitting sections are performed at the occurrence of a temporary communications disabled state, thus requiring a smaller amount of information processing than in the conventional real-time processing.

FOURTH EMBODIMENT

Figure 14:
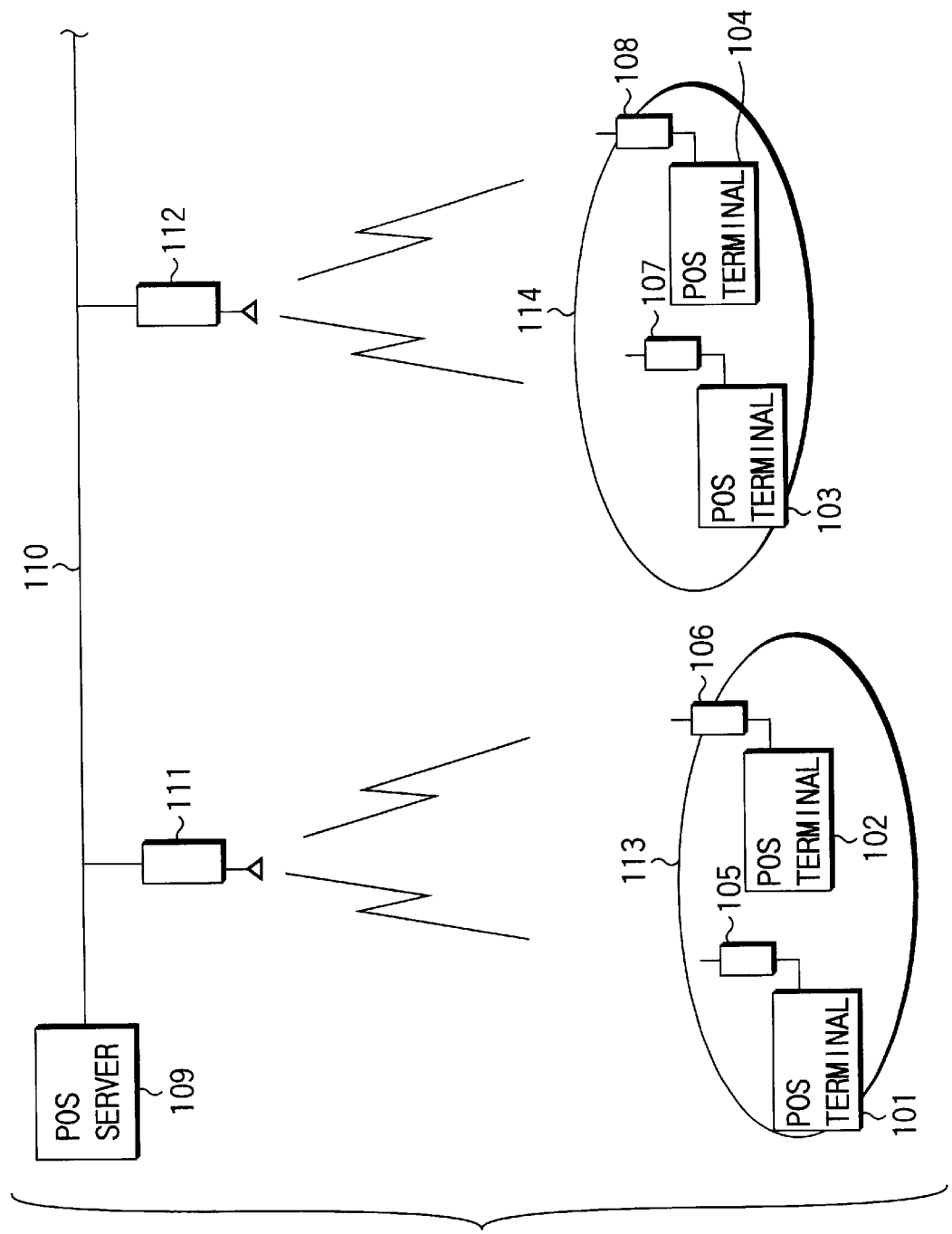
FIG. 14 is a schematic illustration of an indoor radio POS system to which a fourth embodiment of the present invention is applied.

FIG. 14 is a schematic illustration of a wireless POS (point of sales) system to which a fourth embodiment of the present invention is applied. This wireless POS system is constructed from a number of sales data registration terminals that located in a store and register data on sales of goods (hereinafter referred to as POS terminals) 101, 102 103, and 104, terminal stations 105, 106, 107 and 108 respectively connected to the POS terminals 101 to 104, a POS server 109 serving as host equipment that collects sales data registered by the POS terminals 101 to 104 and manages files in which the names and unit prices of goods have been stored, and base stations 111 and 112 connected to the POS server 109 by a LAN (local area network) 110.

Each of the POS terminals 101 to 104 sends to the POS server 109 sales data of goods and inquiries about goods information such as prices. The POS server sends requested information to and downloads programs to each of the POS terminals.

The terminal stations 105 and 106 respectively connected to the POS terminals 101 and 102 are located in the service area 113 of the base station 111. The terminal stations 107 and 108 respectively connected to the POS terminals 103 and 104 are located in the service area 114 of the base station 112.

Figure 15:
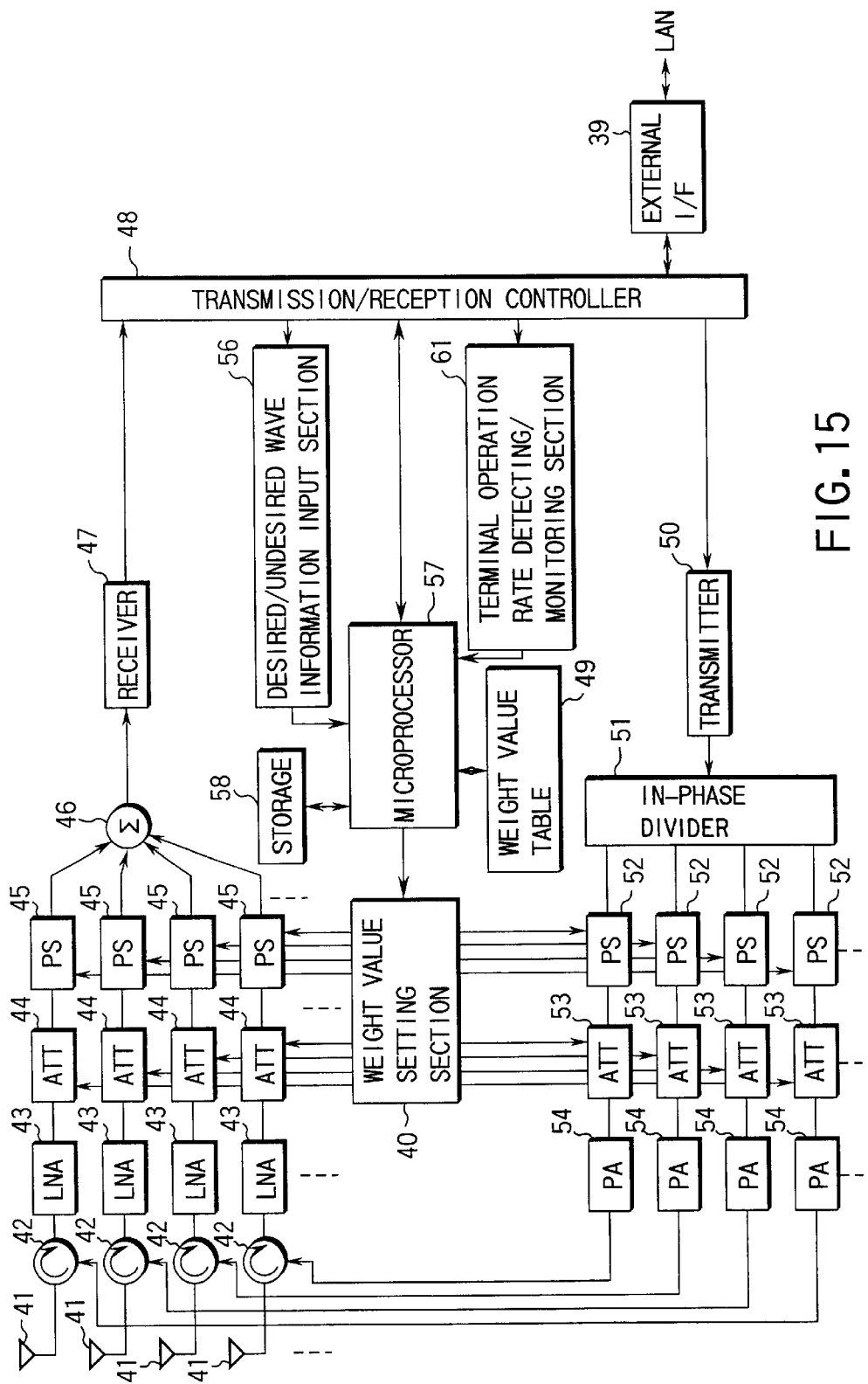
FIG. 15 is a block diagram of a base station in the fourth embodiment of the present invention.

FIG. 15 is a block diagram of the base station according to the fourth embodiment of the present invention. In this figure, like reference numerals are used to denote corresponding components to those in the first embodiment and descriptions thereof are omitted.

The base station is identical in basic arrangement to that in the first embodiment but differs in that, instead of the received level detecting/monitoring section, there is provided a terminal operation rate detecting/monitoring section 61 that detects crowded conditions of the store. This section estimates the operation rate of each of the POS terminals in terms of the number of communication calls made by it per fixed time for inquiries about the prices of goods, thereby detecting crowded conditions of the store. That is, when the operation rate is high, the store is considered to be crowded with shoppers.

The crowded conditions of the store may be detected from the number of customers who come in and out of the store.

When the store is crowded with shoppers, the electromagnetic radiation propagation environment varies relatively slowly due to the movement of people and objects. It is therefore required to recalculate weight values and rewrite the weight values already stored in the weight value table 49 by the new weight values.

Figure 16:
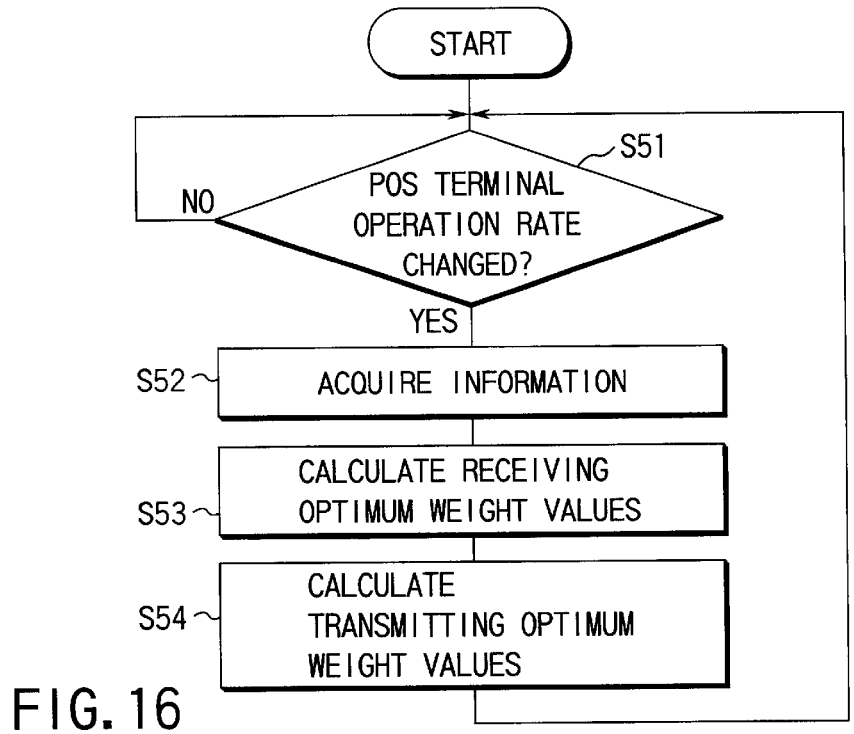
FIG. 16 is a flowchart for recalculation processing of weight values in the fourth embodiment.

FIG. 16 is a flowchart for processing of rewriting the weight values by the microprocessor 57. First, in step S51, a check is made for the occurrence of a variation in the POS terminal operation rate on the basis of the output of the terminal operation rate detecting/monitoring section 61. Upon detecting a variation in the POS terminal operation rate, in step S52 the microprocessor 57 acquires information of arrival directions and received power of desired and undesired radiation in the manner described with reference to FIG. 3.

The microprocessor, in step S53, calculates the optimum weight values for the receiving section in accordance with the adaptive processing algorithm shown in FIG. 5 and then, in step S54, calculates the optimum weight values for the transmitting section in accordance with the transmitting directivity synthesis theory described in conjunction with FIG. 6. Thus, if the store becomes crowded and as a result the electromagnetic radiation propagation environment varies, the microprocessor recalculates weight values to fit the changed condition of the environment and then rewrites the weight value table 49. The procedure then returns to step S51.

In this embodiment as well, the weight value table 49 has been prestored with weight values for the receiving and transmitting sections calculated for each terminal station. For communications with a terminal station, the receiving and transmitting weight values corresponding to that terminal station are read from the table 49 and then set in the weight value setting section 40, thereby controlling the directivity of the array antenna. After that, the base station performs radio communications with the terminal station by the direct spread spectrum spreading technique.

If, during communications, the store is gradually crowded and the POS terminal operation rate becomes so high that the electromagnetic radiation propagation environment is considered to have varied, then the microprocessor 57 calculates weight values for the receiving and transmitting sections anew on the basis of information from the desired/undesired wave information input section 56 and rewrites the weight values stored in the weight value table 49 by the new weight values. Thus, the optimum directivity can be maintained by rewriting the weight values even in the event of a variation in the electromagnetic radiation propagation environment resulting from the crowded condition of the store changing, allowing good radio communications as in the previously described embodiments.

Thus, in this embodiment, when the crowded condition of the store has changed, the weight values are recalculated to rewrite the weight value table 49. Therefore, there is no need to perform both the adaptive processing for the receiving section and the optimum directivity synthesis processing for the transmitting section in real time and hence the fast responsibility is not required. In addition, most of the processing can be implemented by software, allowing the base station to be made very simple in hardware arrangement.

FIFTH EMBODIMENT

With a wireless POS system to which a radio communication system comprising a base station and a number of terminal stations is applied, the crowded condition of a store differs with days of the week and time zones and the electromagnetic radiation propagation environment varies relatively slowly with time. Such a variation causes the optimum directivity for maintaining good communications between the base station and each terminal station to vary. This embodiment is therefore configured to maintain the optimum directivity at all times by recalculating and rewriting weight values according to days of the week and time zones.

Figure 17:
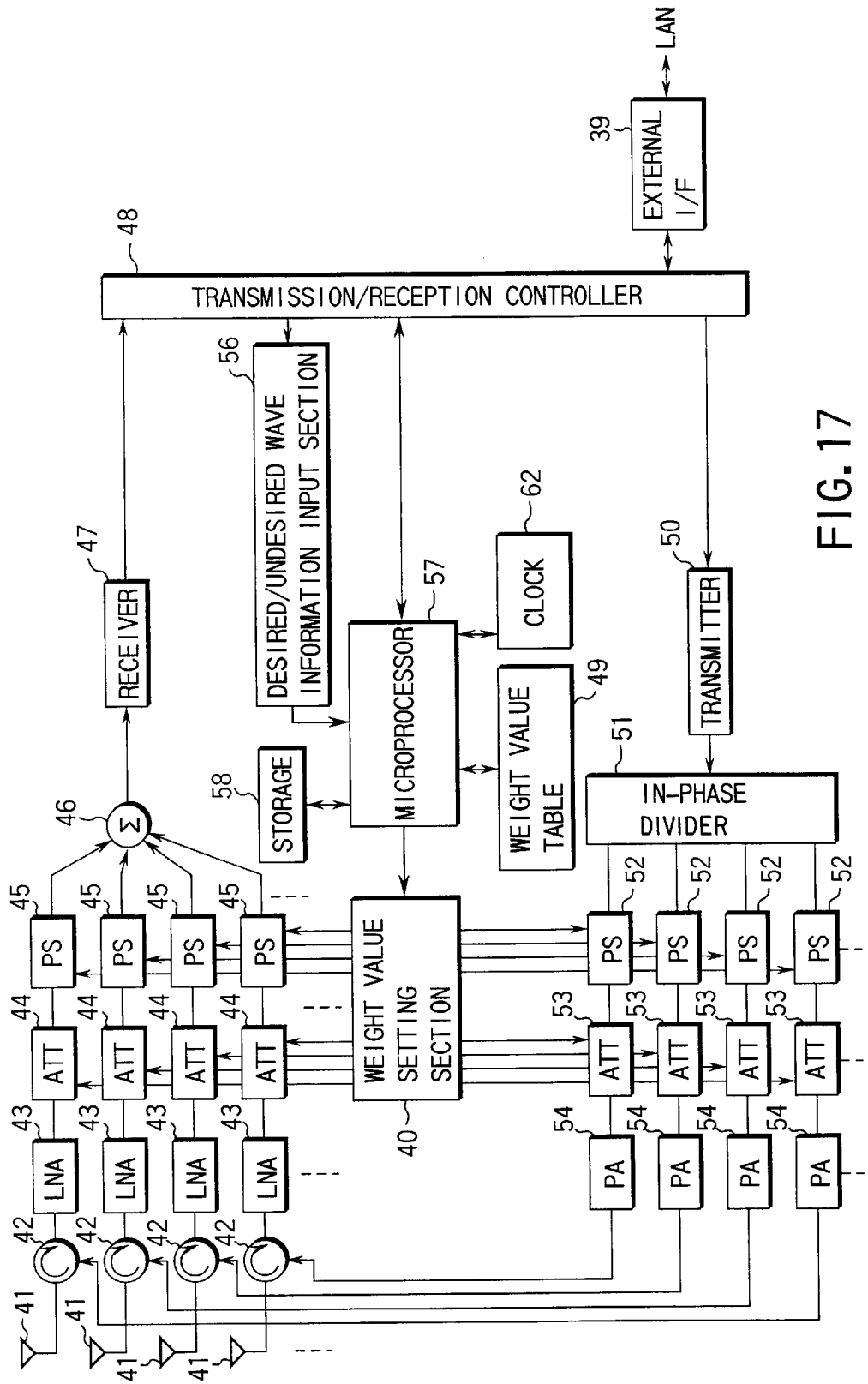
FIG. 17 is a block diagram of a base station in a fifth embodiment of the present invention.
Figure 19:
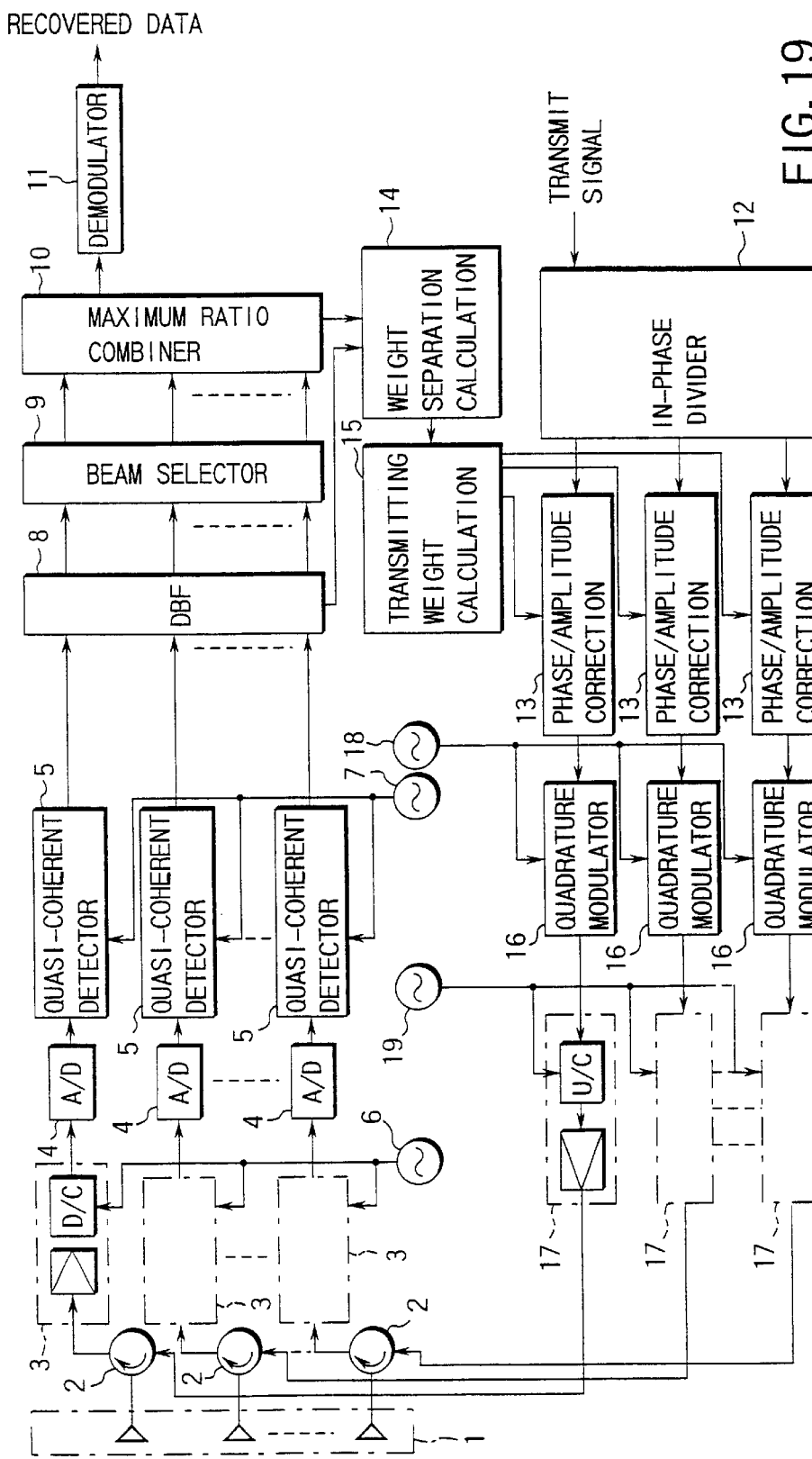
FIG. 19 is a block diagram of a conventional radio communication system.
Figure 20:
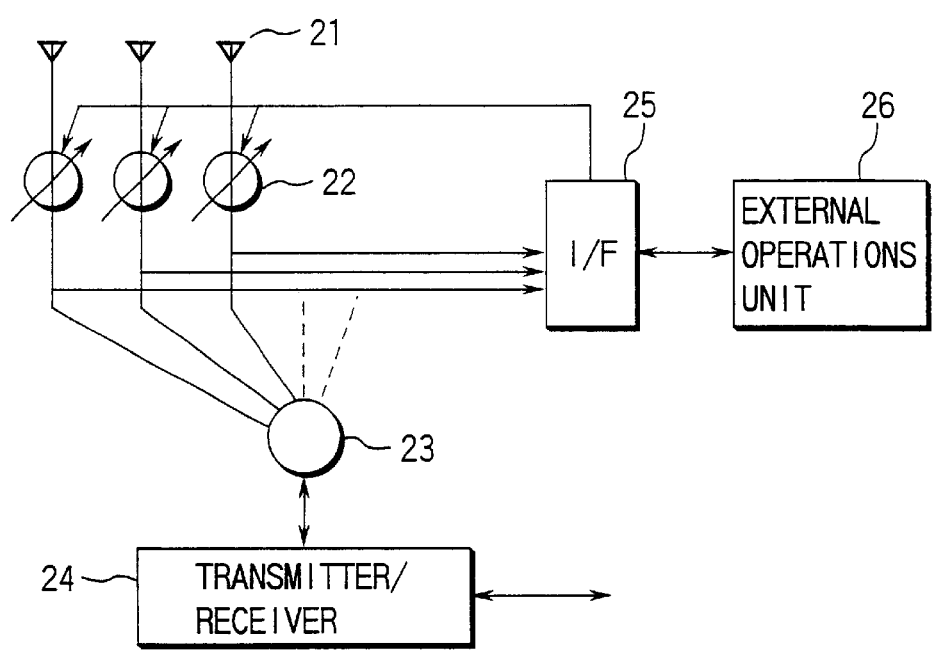
FIG. 20 is a block diagram of another conventional radio communication system.

FIG. 17 is a block diagram of a base station according to the fifth embodiment of the present invention and like reference numerals are used to denote corresponding components to those in the first embodiment.

In this embodiment, in place of the received level detecting/monitoring section in the first embodiment, a clock section 62 is provided which measures the time of day and days of the week. The storage section 58 is provided with a time setting area in which the days of the week and the times of day of recalculating weight values. The days of the week or the times of day are determined empirically or statistically.

Figure 18:
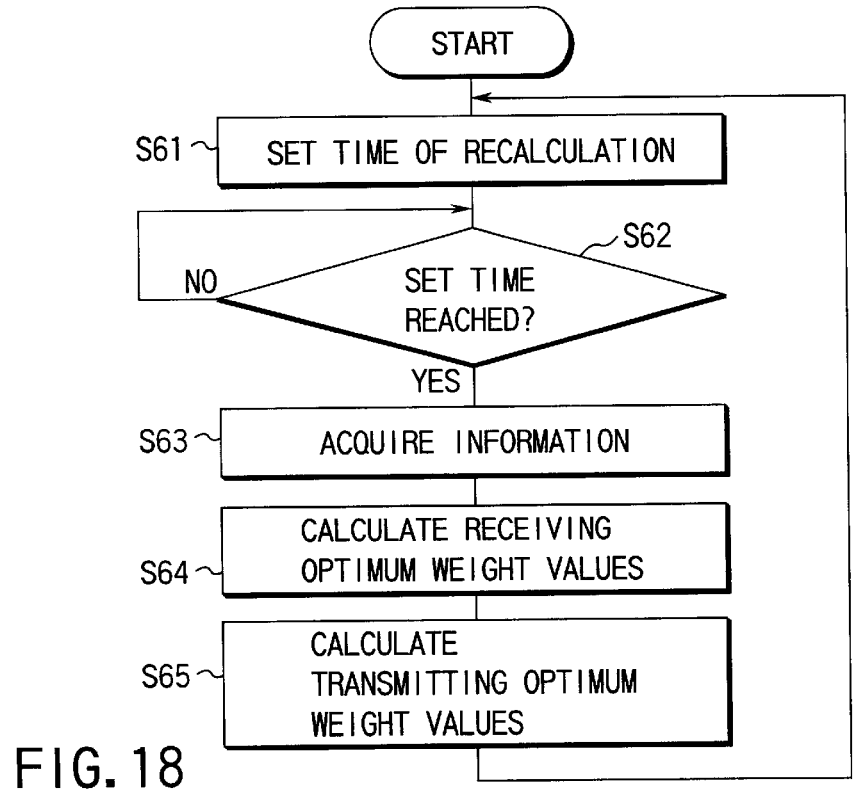
FIG. 18 is a flowchart for recalculation processing of weight values in the fifth embodiment.

FIG. 18 is a flowchart for weight value recalculation processing in the present embodiment. First, in step S61, the microprocessor 57, on each day of the week, reads a time of recalculating weight values from the time setting area in the storage section 58 and places it into a RAM. In step S62, a decision is made as to whether the time of day measured by a clocking section 62 has reached the time set in the time setting area. When the set time has been reached, in step S63, the microprocessor 57 acquires information of arrival directions and received power of desired and undesired radiation in the manner described with reference to FIG. 3.

The microprocessor, in step S64, calculates the optimum weight values for the receiving section in accordance with the adaptive processing algorithm shown in FIG. 5 and then, in step S65, calculates the optimum weight values for the transmitting section in accordance with the transmitting directivity synthesis theory described in conjunction with FIG. 6. The weight values already set in the weight value table 49 are rewritten by the weight values thus recalculated at the time when a set time has been reached. The procedure then returns to step S61, whereby the next recalculation time is read from the time setting area into the RAM and the microprocessor is placed in wait state until the next recalculation time is reached by the time of day measured by the clocking section 62.

In this embodiment as well, the weight value table 49 has been prestored with weight values for the receiving and transmitting sections calculated for each terminal station. For communications with a terminal station, the receiving and transmitting weight values corresponding to that terminal station are read from the table 49 into the weight value setting section 40, thereby controlling the directivity of the array antenna.

When a time set in the time setting area has been reached by the time of day measured by the clocking section 62 during communications, the microprocessor 57 calculates weight values for the receiving and transmitting sections anew and rewrites the weight values stored in the weight value table 49 by the new weight values. Thus, the optimum directivity can be maintained even if in the electromagnetic radiation propagation environment varies according to days of the week and time zones, allowing good radio communications at all times as in the previously described embodiments.

Thus, in this embodiment, the weight values are recalculated when a time set in the time setting area has been reached, not in real time. Therefore, the fast responsibility is not required and most of the processing can be implemented by software, allowing the base station to be made very simple in hardware arrangement.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. In a radio communication system comprising a base station having an array antenna including a plurality of antenna elements, a receiving section which weights the amplitude and phase of each of received signals from the plurality of antenna elements by amplitude and phase weight values of each of the antenna elements set in the receiving section, then combines the weighted signals into a composite signal and demodulates the resultant composite signal and a transmitting section which divides a modulated signal into a plurality of transmit signals, then weights the amplitude and phase of each of the transmit signals by amplitude and phase weight values of each of the antenna elements set in the transmitting section and radiates each of the weighted transmit signals from a corresponding respective one of the antenna elements, and a number of terminal stations each of which is adapted to perform radio communications with the base station, the base station comprising:

a desired/undesired wave information input section which stores an arrival direction and received power of a desired wave from each of the terminal stations and an arrival direction and received power of an undesired wave from an undesired wave source; and weight value rewrite means for recalculating an amplitude and phase weight values of each of the antenna elements to be used in the receiving and transmitting sections based on the information of the desired/undesired wave information input sections and rewriting the amplitude and phase weight values of each of the antenna elements already set in the receiving and transmitting sections with the recalculated weight values.

2. The radio communication system according to claim 1 wherein the base station further comprises:

receiving condition detecting means for detecting a variation in the receiving condition of the receiving section, wherein when a variation in the receiving condition of the receiving section is detected by the receiving condition detecting means, the weight value rewrite means recalculates amplitude and phase weight values of each of the antenna elements to be used in the receiving and transmitting sections.

3. The radio communication system according to claim 1, wherein radio communications are performed between the base station and each of the terminal stations by a frequency hopping spectrum spreading technique, the receiving condition detecting means includes error rate detecting means for detecting an increase in error rate of a demodulated signal by the receiving section, and the weight value rewrite means recalculates and rewrites the weight values in the receiving and transmitting sections when an increase in error rate is detected by the error rate detecting means.

4. The radio communication system according to claim 1, wherein radio communications are performed between the base station and each of the terminal stations by a direct spread spectrum spreading technique, the receiving condition detecting means includes communication disabled state detecting means for detecting a communications disabled state of the base station, and the weight value rewrite means recalculates and rewrites the weight values in the receiving and transmitting sections when a communications disabled state of the base station is detected by the communications disabled state detecting means.

5. In a radio communication system comprising a base station installed in a store and having an array antenna including a plurality of antenna elements, a receiving section which weights the amplitude and phase of each of received signals from the plurality of antenna elements by amplitude and phase weight values of each of the antenna elements set in the receiving section, then combines the weighted signals into a composite signal and demodulates the resultant composite signal and a transmitting section which divides a modulated signal into a plurality of transmit signals, then weights the amplitude and phase of each of the transmit signals by amplitude and phase weight values of each of the antenna elements set in the transmitting section and radiates each of the weighted transmit signals from a corresponding respective one of the antenna elements, a number of terminal stations each of which is installed in the store, connected to a corresponding one of registration terminals for registering data on sales of goods and adapted to perform radio communications with the base station, and host equipment for collecting the data on sales of goods registered by each of the registration terminals via the base station, the base station comprising:

a desired/undesired wave information input section which stores an arrival direction and received sower of a desired wave from each of the terminal stations and an arrival direction and received power of an undesired wave from an undesired wave source, weight value rewrite means for recalculating amplitude and phase weight values of each of the antenna elements to be used in the receiving and transmitting sections based on the information of the desired/undesired wave information input section and rewriting the amplitude and phase weight values of each of the antenna elements already set in the receiving and transmitting sections with the recalculated weight values; and receiving condition detecting means for detecting a variation in the receiving condition of the receiving sections, wherein when a variation in the receiving condition of the receiving section is detected, the weight value rewrite means recalculates amplitude and phase weight values of each of the antenna elements to be used in the receiving and transmitting sections and rewrites the amplitude and phase weight values of each of the antenna elements already set in the receiving and transmitting sections with the recalculated weight values.

6. The radio communication system according to claim 5, wherein the receiving condition detecting means includes time setting means for setting times of recalculating the weight values and a clock for measuring time, and the weight value rewrite means recalculates and rewrites the weight values in the receiving and transmitting sections when a time of recalculating the weight values set by the time setting means is reached by the time measured by the clock.

7. The radio communication system according to claim 5, wherein radio communications are performed between the base station and each of the terminal stations by a frequency hopping spectrum spreading technique, the receiving condition detecting means includes error rate detecting means for detecting an increase in error rate of a demodulated signal by the receiving section, and the weight value rewrite means recalculates and rewrites the weight values in the receiving and transmitting sections when an increase in error rate is detected by the error rate detecting means.

8. The radio communication system according to claim 5, wherein radio communications are performed between the base station and each of the terminal stations by a direct spread spectrum spreading technique, the receiving condition detecting means includes communication disabled state detecting means for detecting a communications disabled state of the base station, and the weight value rewrite means recalculates and rewrites the weight values in the receiving and transmitting sections when a communications disabled state of the base station is detected by the communications disabled state detecting means.

9. A base station adapted to perform radio communications with a number of terminal stations and having an array antenna including a plurality of antenna elements, a receiving section which weights the amplitude and phase of each of received signals from the plurality of antenna elements by amplitude and phase weight values of each of the antenna elements set in the receiving section, then combines the weighted signals into a composite signal and demodulates the resultant composite signal and a transmitting section which divides a modulated signal into a plurality of transmit signals, then weights the amplitude and phase of each of the transmit signals by amplitude and phase weight values of each of the antenna elements set in the transmitting section and radiates each of the weighted transmit signals from a corresponding respective one of the antenna elements, the base station comprising:

a desired/undesired wave information input section which stores an arrival direction and received power of a desired wave from each of the terminal stations and an arrival direction and received power of an undesired wave from an undesired wave source, weight value rewrite means for recalculating amplitude and phase weight values of each of the antenna elements to be used in the receiving and transmitting sections based on the information of the desired/undesired wave information input section and rewriting the amplitude and phase weight values of each of the antenna elements already set in the receiving and transmitting sections with the recalculated weight values; and receiving condition detecting means for detecting a variation in the receiving condition of the receiving sections, wherein when a variation in the receiving condition of the receiving section is detected by the receiving condition detecting means, the weight value rewrite means recalculates amplitude and phase weight values of each of the antenna elements to be used in the receiving and transmitting sections and rewrites the amplitude and phase weight values of each of the antenna elements already set in the receiving and transmitting sections with the recalculated weight values.

10. The base station according to claim 9, wherein radio communications are performed between the base station and each of the terminal stations by a frequency hopping spectrum spreading technique, the receiving condition detecting means includes error rate detecting means for detecting an increase in error rate of a demodulated signal by the receiving section, and the weight value rewrite means recalculates and rewrites the weight values in the receiving and transmitting sections when an increase in error rate is detected by the error rate detecting means.

11. The base station according to claim 9, wherein radio communications are performed between the base station and each of the terminal stations by a direct spread spectrum spreading technique, the receiving condition detecting means includes communication disabled state detecting means for detecting a communications disabled state of the base station, and the weight value rewrite means recalculates and rewrites the weight values in the receiving and transmitting sections when a communications disabled state of the base station is detected by the communications disabled state detecting means.

12. In a radio communication system comprising a base station installed in a store and having an array antenna including a plurality of antenna elements, a receiving section which weights the amplitude and phase of each of received signals from the plurality of antenna elements by amplitude and phase weight values of each of the antenna elements set in the receiving section, then combines the weighted signals into a composite signal and demodulates the resultant composite signal and a transmitting section which divides a modulated signal into a plurality of transmit signals, then weights the amplitude and phase of each of the transmit signals by amplitude and phase weight values of each of the antenna elements set in the transmitting section and radiates each of the weighted transmit signals from a corresponding respective one of the antenna elements, a number of terminal stations each of which is installed in the store, connected to a corresponding one of registration terminals for registering data on sales of goods and adapted to perform radio communications with the base station, and host equipment for collecting the data on sales of goods registered by each of the registration terminals via the base station, the base station comprising:

receiving condition detecting means for detecting a variation in the receiving condition of the receiving section; and weight value rewrite means for, when a variation in the receiving condition of the receiving section is detected, recalculating amplitude and phase weight values of each of the antenna elements to be used in the receiving and transmitting sections and rewriting the amplitude and phase weight values of each of the antenna elements already set in the receiving and transmitting sections with the recalculated weight values, wherein the receiving condition detecting means comprises time setting means for setting times of recalculating the weight values and a clock for measuring time, and the weight value rewrite means recalculates and rewrites the weight values in the receiving and transmitting sections when a time of recalculating the weight values set by the time setting means is reached by the time measured by the clock.

* * * * *